(12) United States Patent
Li

(10) Patent No.: US 10,528,621 B2
(45) Date of Patent: Jan. 7, 2020

(54) METHOD AND SYSTEM FOR SORTING A SEARCH RESULT WITH SPACE OBJECTS, AND A COMPUTER-READABLE STORAGE DEVICE

(71) Applicant: Yu-Hsien Li, Taipei (TW)

(72) Inventor: Yu-Hsien Li, Taipei (TW)

( * ) Notice: Subject to any disclaimer, the term of this patent is extended or adjusted under 35 U.S.C. 154(b) by 456 days.

(21) Appl. No.: 15/375,883

(22) Filed: Dec. 12, 2016

(65) Prior Publication Data

US 2018/0089229 A1 Mar. 29, 2018

(30) Foreign Application Priority Data

Sep. 23, 2016 (TW) .............................. 105130821 A

(51) Int. Cl.
*H04L 29/08* (2006.01)
*G06F 16/58* (2019.01)
(Continued)

(52) U.S. Cl.
CPC .... *G06F 16/5866* (2019.01); *G06F 16/24578* (2019.01); *G06F 16/58* (2019.01);
(Continued)

(58) Field of Classification Search
CPC ........ G06F 3/011; G06F 3/005; G06T 19/006; G06T 3/20; G06T 19/20; G06T 11/00;
(Continued)

(56) References Cited

U.S. PATENT DOCUMENTS

2009/0036190 A1 2/2009 Brosnan et al.
2011/0199479 A1 8/2011 Waldman
(Continued)

FOREIGN PATENT DOCUMENTS

| JP | 2012209833 A | 10/2012 |
| JP | 2015056152 A | 3/2015 |
| TW | 201324389 A | 6/2013 |

OTHER PUBLICATIONS

David M Chen, et al., "City-scale landmark identification on mobile devices",Computer Vision and Pattern Recognition (CVPR), 2011 IEEE Conference On, IEEE, Jun. 20, 2011 (Jun. 20, 2011), pp. 737-744.
(Continued)

*Primary Examiner* — Cheyne D Ly
(74) *Attorney, Agent, or Firm* — Li & Cai Intellectual Property (USA) Office

(57) ABSTRACT

The disclosure is related to a method and a system for sorting a search result with multiple space objects. The method is operated in a mobile device, and firstly a photographing unit therein is activated to capture an image of a real scene. The system receives the image information and the space information of the mobile device. The system conducts a comparison search using the captured space information/image information against a database for generating a preliminary search result. The space objects in the search result are sorted for generating a ranking list. One of the ranking criteria is based on the relevance data of the user for determining high relevance space objects. The basis for ranking can be time, objective data, or a system weighted value associated with every object. Then the mobile device displays the highest ranked space object from the search result combined with the real scene.

20 Claims, 13 Drawing Sheets

(51) Int. Cl.
   *G06F 16/9537* (2019.01)
   *G06F 16/2457* (2019.01)
   *H04W 4/029* (2018.01)
   *G06F 16/583* (2019.01)
(52) U.S. Cl.
   CPC ........ *G06F 16/583* (2019.01); *G06F 16/9537* (2019.01); *H04L 67/1097* (2013.01); *H04W 4/029* (2018.02)
(58) Field of Classification Search
   CPC ......... G06T 15/506; G06T 2207/30204; G06T 15/00; G06K 9/00671
   See application file for complete search history.

(56) References Cited

U.S. PATENT DOCUMENTS

| | | | |
|---|---|---|---|
| 2012/0203799 A1 | 8/2012 | Blanchflower et al. | |
| 2013/0073988 A1* | 3/2013 | Groten | G06Q 30/02 715/753 |
| 2013/0187951 A1 | 7/2013 | Suzuki | |
| 2014/0028716 A1 | 1/2014 | Yeh | |
| 2014/0111547 A1 | 4/2014 | Bilbrey et al. | |
| 2015/0099252 A1* | 4/2015 | Anderson | G09B 19/003 434/257 |
| 2015/0154799 A1* | 6/2015 | Rios | G06T 19/006 345/633 |
| 2016/0071319 A1* | 3/2016 | Fallon | G06T 19/006 345/633 |

OTHER PUBLICATIONS

Gabriel Takacs, et al., "Outdoors augmented reality on mobile phone using loxel-based visual feature organization", Proceedings of the Workshop on Multimedia Information Retrieval(MIRO), XX, Vancouver, B.C., Canada, Oct. 30, 2008 (Oct. 30, 2008), pp. 427-434.

* cited by examiner

METHOD AND SYSTEM FOR SORTING A SEARCH RESULT WITH SPACE OBJECTS, AND A COMPUTER-READABLE STORAGE DEVICE

BACKGROUND OF THE INVENTION

1. Field of the Invention

The present invention is generally related to a method and a system for searching for objects within a there-dimensional space, in particular to the method and the system allowing a user using a mobile device to search for a location-based space object in a specific environment, and sorting the objects in a search result.

2. Description of Related Art

A user generally uses text to search information in the Internet through a web browser. Further, using a picture to search for pictures over the Internet is a known technology. In the searching process, one or more keywords can be used to conduct the searching or the searching service provides several selective search conditions for narrowing the range of search based on the user's interests.

Furthermore, the technology of a search engine provides a relevant search result to the user according to the user-relevant data. The user-relevant data is such as the user's personal data, preferences and the history activity including the search records and click-through behavior for interests. The user-relevant data also acts as criteria for sorting. The user's content of interest can be listed on the first few pages of the search result. Further, the objective data such as timeliness, updating rate, and/or others' appreciations can be factors for filtering the search result or for sorting the search result.

More, the search engine allows the advertisers to buy the pages for their advertisements. These commercial activities can influence the ranking of the search result, and also insert the relevant ads for the users.

SUMMARY OF THE INVENTION

Rather than the conventional technology that lacks functions of searching for location-based objects according to the space positioning information, the disclosure in accordance with the present invention is related to a method and a system for sorting the search result having the space objects, and a non-transitory computer-readable medium. The method particularly adopts the technologies of augmented reality and location-based search engines. The method allows a user at a place to manipulate a mobile device toward an orientation of interest of a space for searching for a space object.

In an embodiment, the method for searching for the space object is primarily operated in a mobile device that is cooperated with a cloud system for processing the steps of sorting the space objects. The process performed in the mobile device includes activating a photographing unit of the mobile device for capturing a real scene image, generating image information by resolving the real scene image, and also obtaining the space information of the mobile device. It is noted that the image information of the real scene image is such as a color block data and line data; and the space information includes a ground-position data and a space-angle data of the mobile device. The information is then uploaded to a server of the cloud system. In the server, the space information and/or the image information is employed to generate a preliminary search result that includes the space objects that have corresponding space information of the mobile device.

After that, the mobile device receives the preliminary search result from the server. In the mobile device, the preliminary search result is under a sorting process, and a sorted result is then outputted. The sorting process may be based on a user relevant data, and causes the space objects with higher relevance to be the higher ranked space objects, and on the contrary the rest of the space objects have lower priority ranking.

The further reference for sorting is such as timeliness. The space object has a time property. The sorting step unitizes a system time of the server to filter out the preliminary search result for excluding the space object that does not match a time parameter. Alternatively, the space object has been set as an effective display time period that acts as a reference for sorting the search result and eliminating the space objects that expire prior to the system time.

The user relevant data can be based on a user identification of a user of the space information, and the user relevant data allows the server to exclude the space object that is not available to the user. A personal space object corresponding to the user identification can be therefore obtained. The user relevant data can be the user-defined preferences and historical record. An objective data can be a reference for sorting. The objective data is such as a time to create the space object, an updated time, an effective time period, a click through rate and/or ranking of the space object. The sorting step utilizes an objective data to determine the priority ranking of the space objects.

The sorting process can utilize a weight value for every space object created by a space object provider. The cloud system computes a system weighted value using the weight values of a plurality of space objects. The space object with higher system weighted value has higher ranking.

The method for sorting the search result is operated in the cloud system. The steps in the method include using the server to receive positioning information generated by the mobile device, and image information of the real scene image taken by a photographing unit of the mobile device. Thus, in the server, the received positioning information, or adding the image information, is used to enquire the database so as to produce a preliminary search result. The above-mentioned references for sorting allow the server to output the sorted space object in the search result provided for the user end mobile device.

In the cloud system, according to one of the embodiments, the cloud includes a search database that is used to record information of a plurality of space objects and each space object's corresponding positioning information and/or image information, and also a search criterion; and a space object database that is used to store the space objects. Every space object has an ID for linking to its relevant positioning information and/or image information, and search criteria in the search database. The system provides a server that has one or more processors for executing the method for searching and sorting the space objects.

According to the disclosure, a non-transitory computer-readable storage is provided for recording the instruction set operated in the mobile device. The instruction set is executed by the processor of the mobile device for performing the method for sorting the space objects.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The disclosure in accordance with the present invention is related to a method and a system for sorting space objects, and a non-transitory computer-readable storage. The system includes a cloud-based system, and a proprietary software program installed in a user-end mobile device. The cloud-based system has a server and a database. The server may be served by a plurality of hosts. The server provides a user management interface that allows a user to utilize his mobile device to upload information, such as the mobile device's location and its space information, and, optionally, image information related to a background. The uploaded data allows the system to establish a database providing a searching service when it records the data of a plurality of location-based space objects uploaded by the plurality of users. A search engine is therefore constituted. The search engine provides for the user to search for the space object based on geographic and space information.

The system allows the user to manipulate the mobile device to search the space object(s) at the location. While operating the mobile device, the positioning information generated by a sensor in the mobile device is uploaded to the cloud system. In the meantime, a photographing function is initiated to capture a real scene image at the location. The image information of the real scene image also acts as the reference to position the space object. The system is able to provide a search result including the space object having the corresponding positioning information and/or image information. Further, the system provides the result under a sorting process.

To implement the method for sorting the search result of the space objects in accordance with the present invention, the cloud system first establishes a database to store data about the space objects. The system allows the multiple users to operate their mobile devices for creating the space objects in the database that is configured to render a search service. The following diagrams, e.g. FIG. 1A through FIG. 1C, depict the circumstances under which the users use the mobile devices to create the location-based space objects.

Figure 1A:
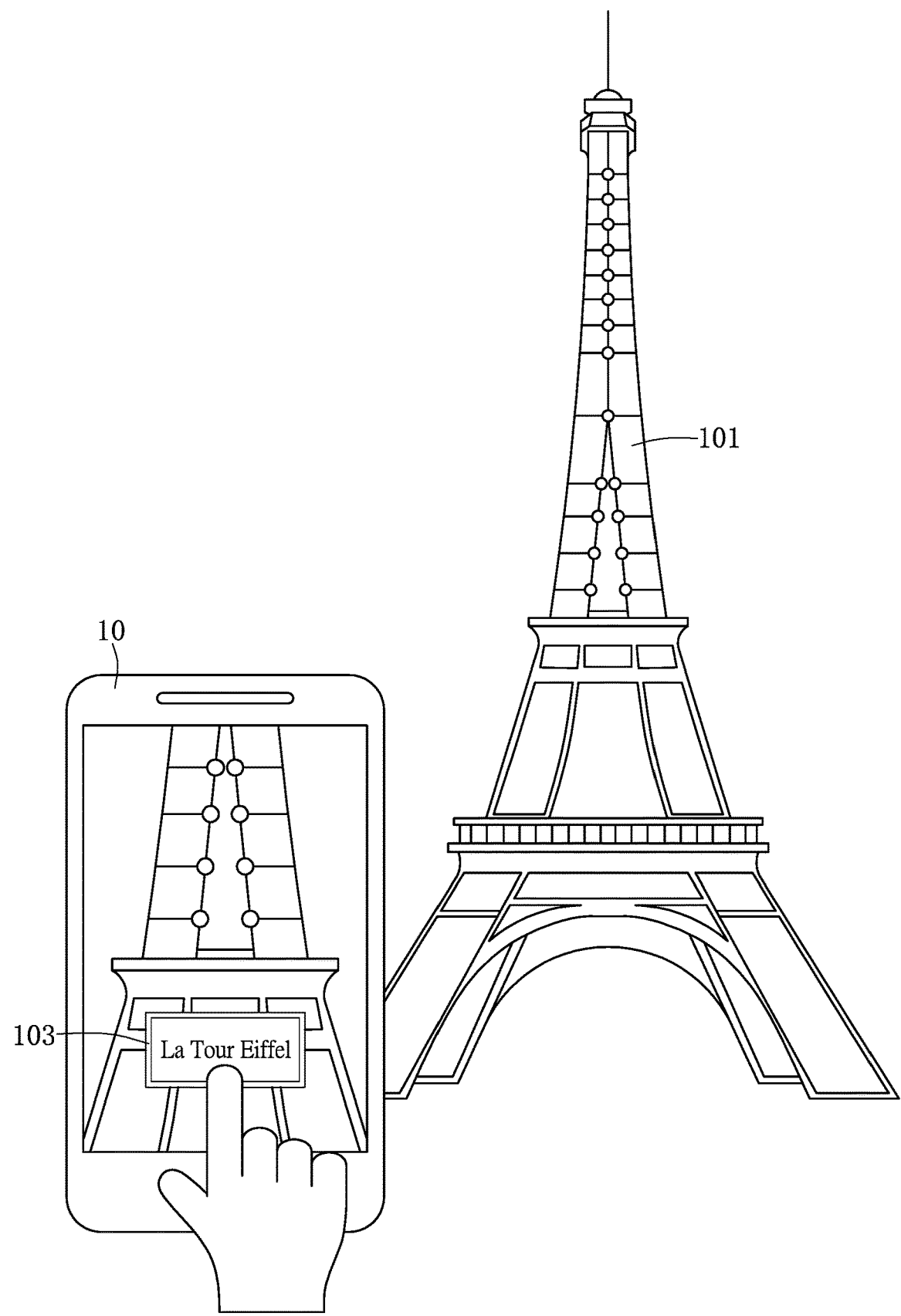
FIG. 1A through 1C shows a schematic diagram describing a circumstance of a user manipulating a mobile device to create a location-based space object in one embodiment of the present invention.
Figure 1B:
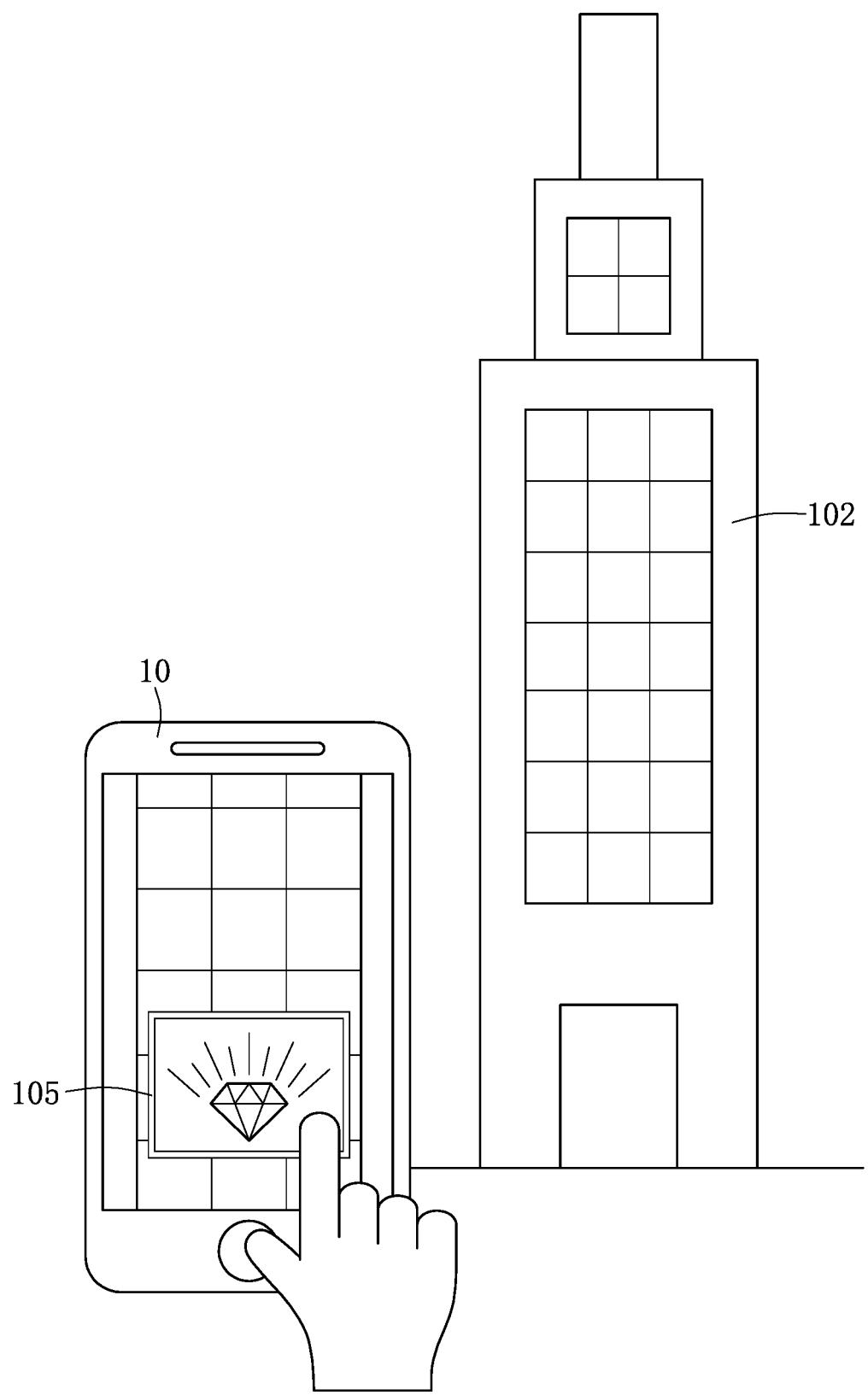
Figure 1C:
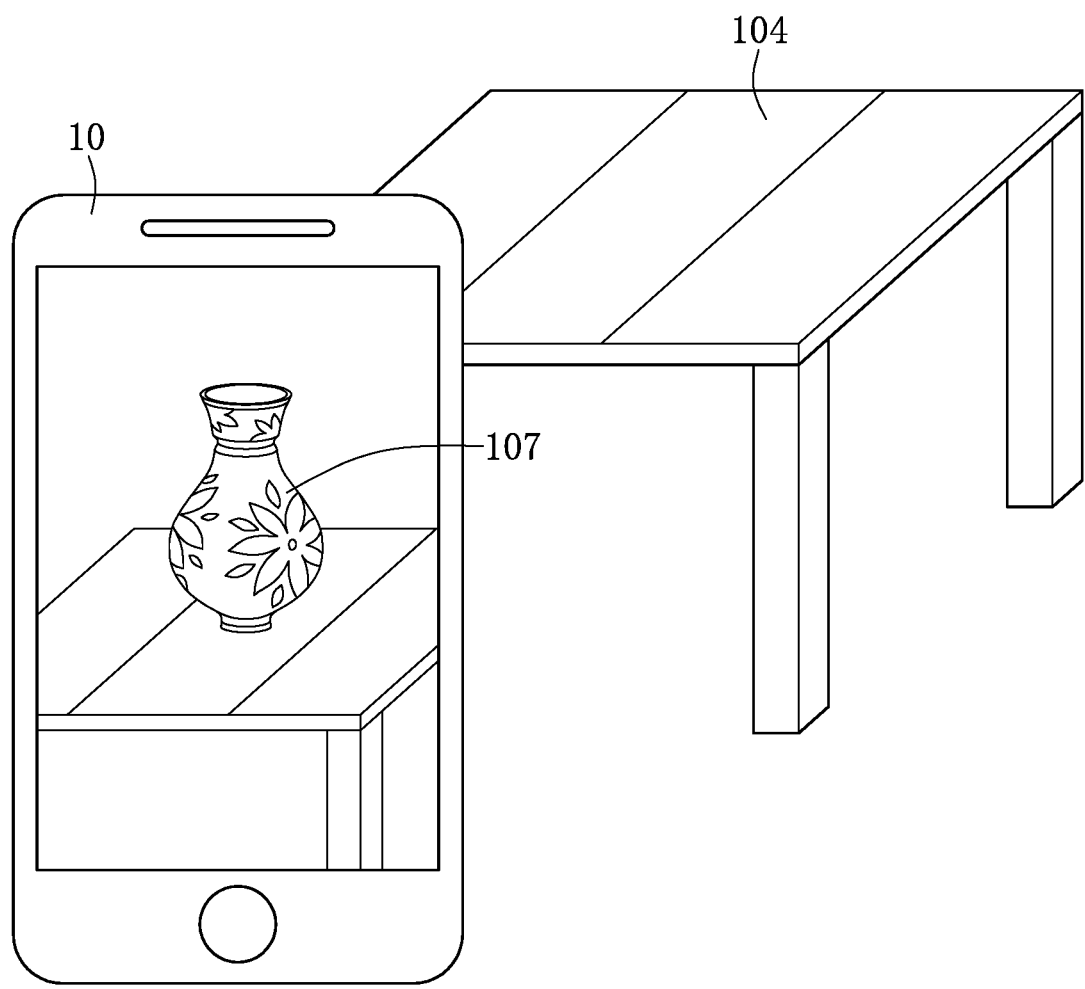

As FIG. 1A shows, a user utilizes a mobile device 10 to install a software program provided by a system, e.g. the system allowing the users to upload and search the space objects. The software program is such as an APP installed in an intelligent device. When the software program is initiated, the operation is under a data establishment mode. A camera module of the mobile device 10 is activated. Through the user's manipulation, the mobile device 10 is directed to a target to be annotated. The target is such as a building, a shop, a landscape, or an article. Through a screen of the mobile device 10, the user can see a real scene 101 related to the target. After that, an Augmented Reality (AR) technology can be applied. The user can utilize a touch-sensitive display of the mobile device 10, or other input method to add a new message onto a region of the real scene 101. The message can be a text, a picture, a video or a sound, or a combination thereof.

This example shows the user stands up in front of a famous attraction, e.g. the Eiffel Tower. The user manipulates the mobile device 10 to direct it towards the real scene 101, and annotates a note such as its title 'Eiffel Tower.' This annotation is a space object 103 defined by the system of the present invention.

After that, the user is required to confirm the space object 103, e.g. the annotation, accompanied with its corresponding space information over the real scene 101. The software program executed by the mobile device 10 transmits the data of the space object 103 and its corresponding space information to a server or a host of the system. The space object 103 can be any type or any combination of a text, a picture, a video, and a sound. The mentioned space information includes a ground-position data, a space-angle data, and image information of the real scene 101 when the space object 103 has been created. The space angle can be a combination of an azimuth angle and an elevation angle.

Under a search and display mode, the image information is the characteristics of the real scene 101, such as color blocks and the lines between the adjacent color blocks with respect to the Eiffel Tower behind the space object 103. The ground-position data, the space-angle data, the color block data, and the line data form the parameters for searching for the space object 103. These data are stored in the cloud-based server of the system.

When the user manipulates the mobile device 10 to generate and upload the space information, the cloud-based server gets the space object 103 through a comparison operation. In general, the ground-position data and the space-angle data are the requisite factors provided for the cloud-based server to find the space object 103. If it is necessary, the server goes on the comparison using the color block data and/or line data transmitted by the mobile device 10; or conducts the comparison using the line data, or adding the color block data when the space object 103 cannot be identified through the line data. In consequence of the process, a search result is transmitted to the mobile device 10.

Further, the mobile device 10 displays the space object 103 through an interface initiated by the software program. A link icon can be used to link to further information. The space object 103 in itself can also be a link button provided for the user to click for having more information about the space object 103. Further information related to the space object can be provided by the system; or the information accompanied with the space object can be added when the space object has been created. In an exemplary example, when the space object indicates a link of a scenic spot, its introduction, traffic information, and nearby information can be obtained when the link is clicked. When the space object indicates a store, further information such as the store's contact information and discount program is provided to be referenced by the user.

FIG. 1B shows another diagram illustrating a circumstance for creating the location-based space object in one embodiment of the present invention. The user operates the mobile device 10 to initiate the software program. Under a data establishment mode, the camera module is activated. When the mobile device 10 is facing toward a scene 102, exemplarily a building, the system allows a space object 105 to be overlapped over several floors of the building precisely by an AR technology. The space object 105 is a picture in this example, and the picture conveys the information related to the floors covered on or about this scene 102.

For example, if a company is located at the floors directed at by the mobile device 10, the space object 105 can be the text, video, and/or picture introducing the company, or even the company's product advertisement or recruitment information. When the company annotates this space object 105, the space information related to this space object 105 is transmitted to the server. The space information not only includes the image data of the space object 105, but also the ground-position data and the space-angle data of the mobile device 10, and the image information of the real scene 102 when the space object 105 was made. The image information of the scene 102 indicates the color block data and line data between the color blocks of background of the space object 105 when the space object 105 was made.

When the space information with respect to the space object 105 has been established, the ground-position data, the space-angle data and the image information for the space object 105 are transmitted to the system, and act as the parameters stored to a database for searching for the space object 105 in the future.

Further, to create the space object 105, the user can render it with more functions such as defining a URL link to the space object 105 that allows others to get more information when space object 105 is searched for. The URL may direct to a webpage rendering an interface allowing the user to get more interactive services such as conducting a video conference, a message conversation or online shopping.

FIG. 1C schematically shows a circumstance depicting one of the embodiments of the present invention.

In the diagram, an indoor table is shown in a real scene 104. A mobile device 10 is utilized to capture an image of the real scene 104. Via a program interface, a space object 107 is selected and overlapped to the real scene 104. The example shows a vase is added on the table. Some other types of messages such as a text, a video or a picture, or a combination thereof also act as the space object. Similarly, the software program executed in the mobile device 10 transmits the space information with respect to this space object 107 to the server when the user has confirmed the position of the space object 107. The space information exemplarily includes the image of the space object 107, and its corresponding ground-position data, space-angle data, and the image information of the real scene 104.

It is worth noting that the mobile device 10 may not easily get the GPS signal if it is utilized to capture an image of an indoor real scene 104. In exemplary example, the proprietary software program of the mobile device 10 can adopt the latest positioning information from the GPS module of the mobile device 10. The latest positioning information helps the system to estimate the position of the mobile device 10. For example, the mobile device 10's latest positioning information helps the software program to locate the mobile device 10 if it is in a building or any range where the device cannot receive the GPS signal. However, even though the software program can estimate the position of the mobile device 10, the program cannot accurately locate the mobile device to find any space object. For achieving accurate positioning technique, the software program in accordance with the present invention further uses image information with respect to the real scene where the camera module of the mobile device 10 takes a view to be a reference for positioning. In one embodiment of the present invention, the image information can be color block data and/or line data associated with the real scene where the space object is positioned.

According to one of the embodiments, the real scene is usually a background image with respect to an added space object. Reference is made to FIG. 1C. A software program executed in the mobile device 10 processes the image of a table surface so as to form a color block data and a line data. The powerful cloud-based server may directly recognize the image and the image information that is used to precisely locate the space object. Preferably, the image information with respect to the image of the table surface can be simplified to a digital form that is easily stored and used. No matter how much power capability of computation the server owns, rather than using the image recognition applied to the image, the pre-processing step allows the system to utilize the digital message of the image of the real scene in order to provide a fast searching service. The digital message of the image of the real scene provides sufficient information to expedite the searching service for accurately searching for the corresponding space object.

That means, for providing service of searching and sorting the space objects, at the server end an operation procedure is performed to locate the space object according to the ground-position data and space-angle data. In an exemplary example, a Global Positioning System (GPS) installed in the mobile device is used to acquire the ground-position data; and a Gyroscope in the mobile device is utilized to obtain the space-angle data such as a combination of an azimuthal angle and an elevation angle of the mobile device. More, under the search and display mode, the server will consider the image information such as the color block data relating to the real scene if the ground-position data and the space-angle data fail to accurately locate the space object. Still further, the server may use the line data to assist the searching process if the color block data is insufficient to locate any space object. The system consequently provides a search result including at least one matched space object, or provides an option menu.

The ground-position data is generally read out from a positioning circuit, e.g. a GPS module, in the mobile device. The positioning data can also be obtained from other auxiliary positioning signals such as the signals from mobile stations or a wireless local area network. In an example, when the mobile device is located at a place where it cannot receive GPS signals, the system regards the latest received positioning signals as the ground-position data other than incorporating the auxiliary positioning signals. Next, the system receives the signals generated by a space-positioning circuit, e.g. a gyroscope, in the mobile device, and the signals form the space-angle data.

Figure 2A:
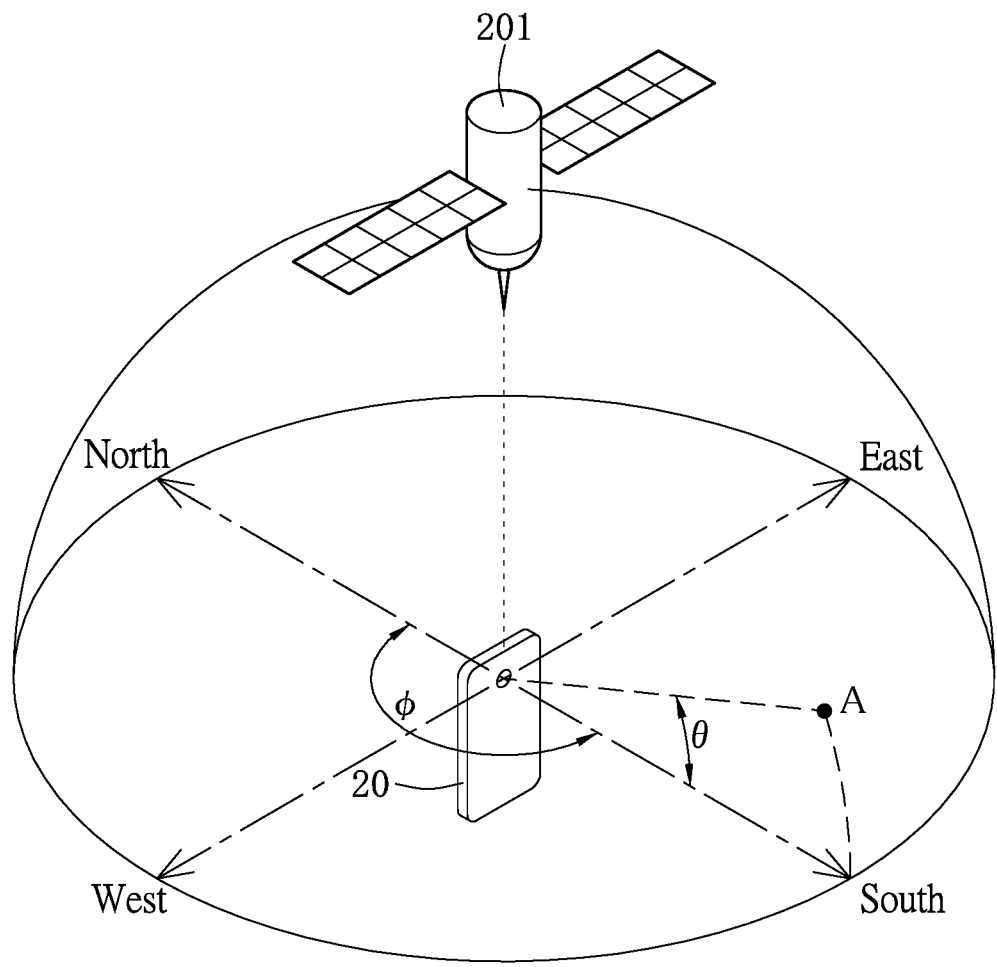
FIG. 2A shows a schematic diagram depicting coordinates indicating a space-angle data.

The schematic diagram shown in FIG. 2A depicts the formation of the space-angle data. A spatial coordinate system can be exemplarily defined by a pair of an azimuth angle $\varphi$ and an elevation angle $\theta$. The azimuth angle $\varphi$ is especially an angular measure of a spherical coordinate system. In one of aspects of the present invention, the mobile device 20 renders the spatial coordinate system. An origin of the spatial coordinate system indicates a position where the mobile device 20 held by the user, e.g. an observer, is located. The horizontal plane develops the spherical coordinates for defining the azimuth angle $\varphi$ ranging from 0-degree angle (direction of North), 90-degree angle (direction of East), 180-degree angle (direction of South), 270-degree angle (direction of West), and to 360-degree angle (back to direction of North). The azimuth angle can be described based on a reference axis, e.g. the North axis, for defining an azimuthal direction of the mobile device 20. For example, the direction A that a rear camera of the mobile device 20 points toward indicates the azimuthal direction. This direction A constitutes the azimuth angle $\varphi$ and the elevation angle $\theta$. Both the azimuth angle $\varphi$ and the elevation angle $\theta$ can be determined by a space-positioning unit in the mobile device 20. A combination of the azimuth angle $\varphi$ and the elevation angle $\theta$ forms the space-angle data for this direction A. When this space-angle data is combined with the ground-position data generated in the mobile device 20 through the positioning satellite 201, the mobile device 20 can be positioned by its position and pointing direction. A kind of space information is therefore formed. The space information is provided to the system for obtaining a space object that is displayed on the mobile device 20 through an operation procedure.

Figure 2B:
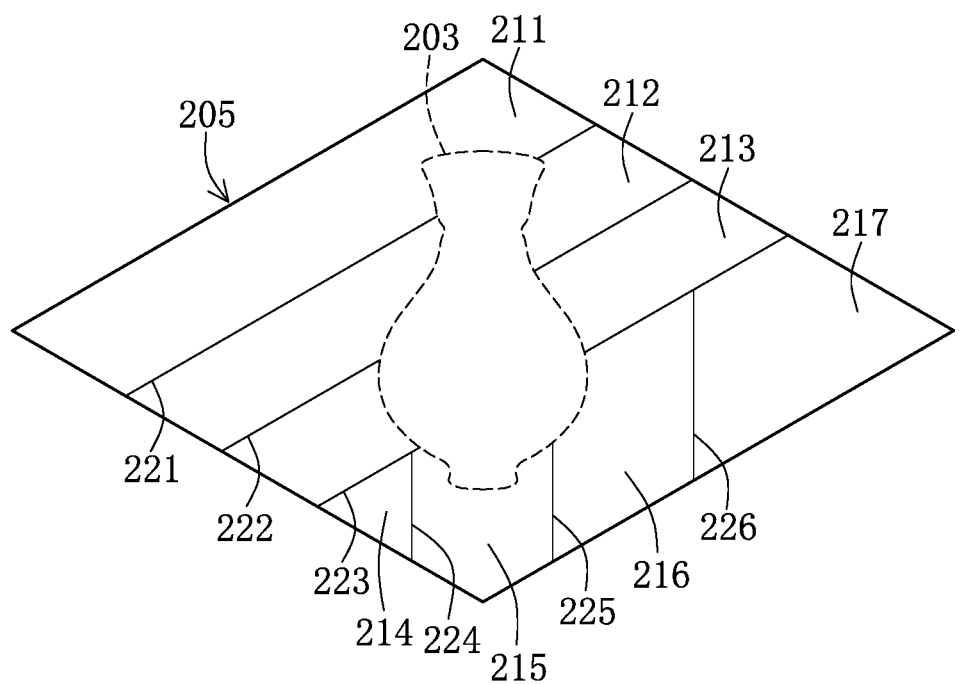
FIG. 2B shows a schematic diagram retrieving image information related to a background of the space object.

FIG. 2B shows a schematic diagram depicting a technique to obtain the image information with respect to a space object. A space object 203 indicated by a dotted-line frame in the diagram is positioned over a background image 205. When the space object 203 has been created, the server acquires information relating to the space object 203 from the mobile device at the user end. The information relating to the space object 203 includes an image of the space object 203, and its positioning information such as a ground-position data and a space-angle data. The image information of the background image 205 can also be acquired by the server. The positioning information, optionally with the image information of the background image 205, constitutes the parameters of space information for locating the space object 203. Further, more information can be annotated to the space object 203. For example, a hyperlink can be annotated to the space object 203 that allows a user to get further information when he has searched for this space object 203. The hyperlink is clickable to link a webpage or a shopping interface for further interaction.

The image information of the background image 205 can be composed of a color block data and a line data through an image processing process. In one embodiment, the image processing process can be performed using a software program executed in the mobile device, or in the cloud-based server. The image processing process extracts the characteristics such as the color blocks and the lines therebetween from the background image 205. Both the color blocks and the lines act as the parameters for locating the space object.

In an exemplary example, the pre-processing method first sketches the background image 205, for example, using the lines 221, 222, 223, 224, 225, and 226. The blocks 211, 212, 213, 214, 215, 216, and 217 are formed by the lines 221, 222, 223, 224, 225, and 226. After that, an average of the pixel values in every block can be computed. The average denotes a color block data with respect to every block. In one further embodiment, a normalization method can be performed onto the pixels of every block so as to compute every block's characteristic value. The characteristic value is regarded as the block's color block data. It is noted that the image pre-processing method is not limited to the above disclosure. The image under the pre-processing method is not limited to be within any specific chromatic space, but it can be within an RGB space, a HSV (Hue, Saturation, and Value) space, or a CMYK (Cyan, Magenta, Yellow, and Black).

It is worth noting that, the information relating to the lines 221, 222, 223, 224, 225, and 226 for the background image 205 conveys a line data that acts as the reference for displaying the space object 203. Through the image processing process, the space object 203 can be positioned on the plane just as it should be placed.

Figure 3:
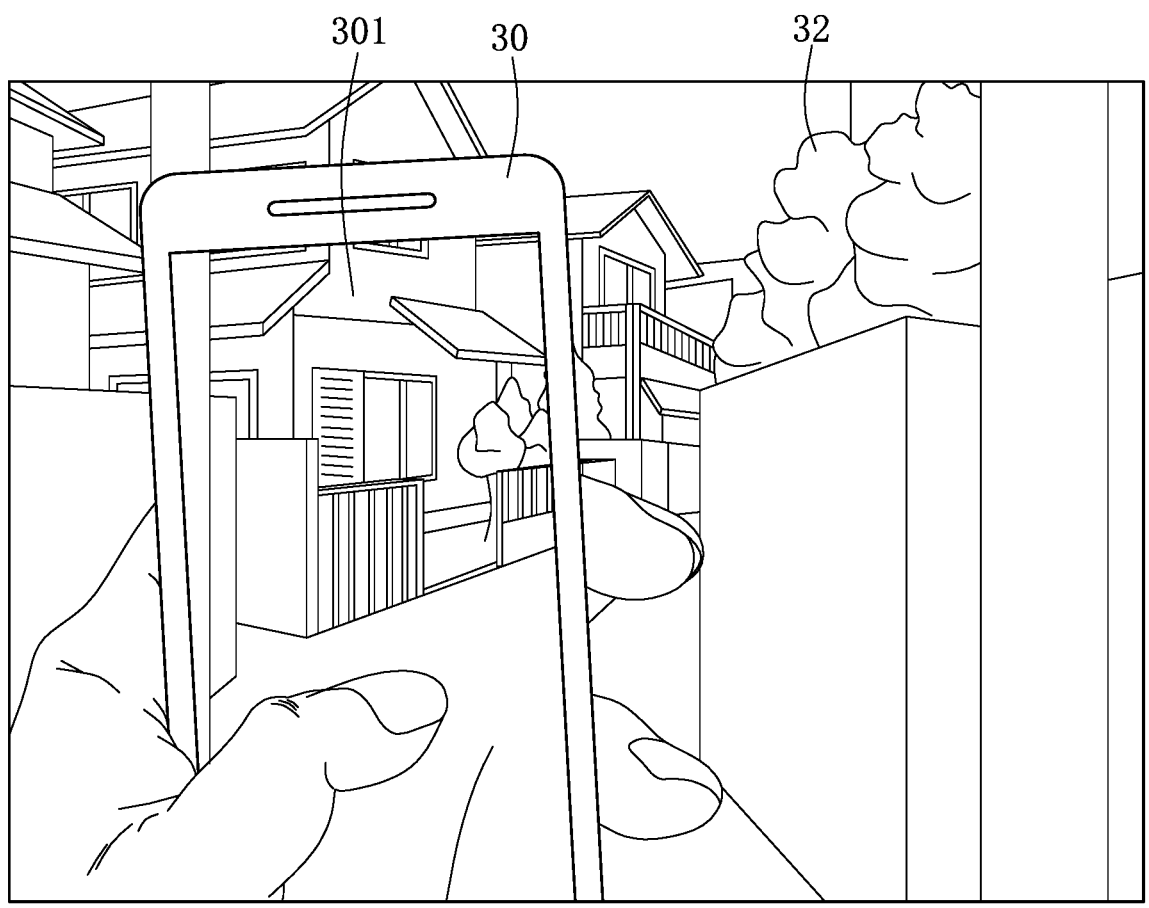
FIG. 3 shows a schematic diagram describing a circumstance that a user manipulates a mobile device to conduct a searching or sorting method of the present invention.

FIG. 3 shows a circumstance that a user uses a mobile device to search a space object in accordance with the present invention.

The mobile device 30 acts as a carrier such as a mobile phone or a tablet handheld by the user. However, the carrier to implement the method of the present invention can be, but is not limited to, a pair of intelligent glasses, a pair of AR/VR glasses, or any portable device accompanied with the user. One of the objectives of the carrier, e.g. the mobile device 30, is to display an image of a real scene 32 on its display screen 301, and as well, obtain the space object having the relevant position and space when connecting to the cloud system.

As shown in this exemplary example, the user uses the mobile device 30 to change its position in a space. The mobile device 30 moves at an azimuthal angle and an elevation angle, as described in FIG. 2A. This kind of space information will be transmitted to the cloud system. In the cloud system, the space information is employed to enquiry for the space object(s) with similar space information stored in the database. Further, a software program executed in the mobile device 30 is initiated to firstly capture the image of the real scene 32. The image information of the real scene 32 can be resolved by the software program, and used to be auxiliary information to position the space object. The image information is also uploaded to the cloud system for comparison purposes. Through an AR technology, the space object in the search result is overlapped with the real scene 32 displayed on the display screen 301.

Figure 4:
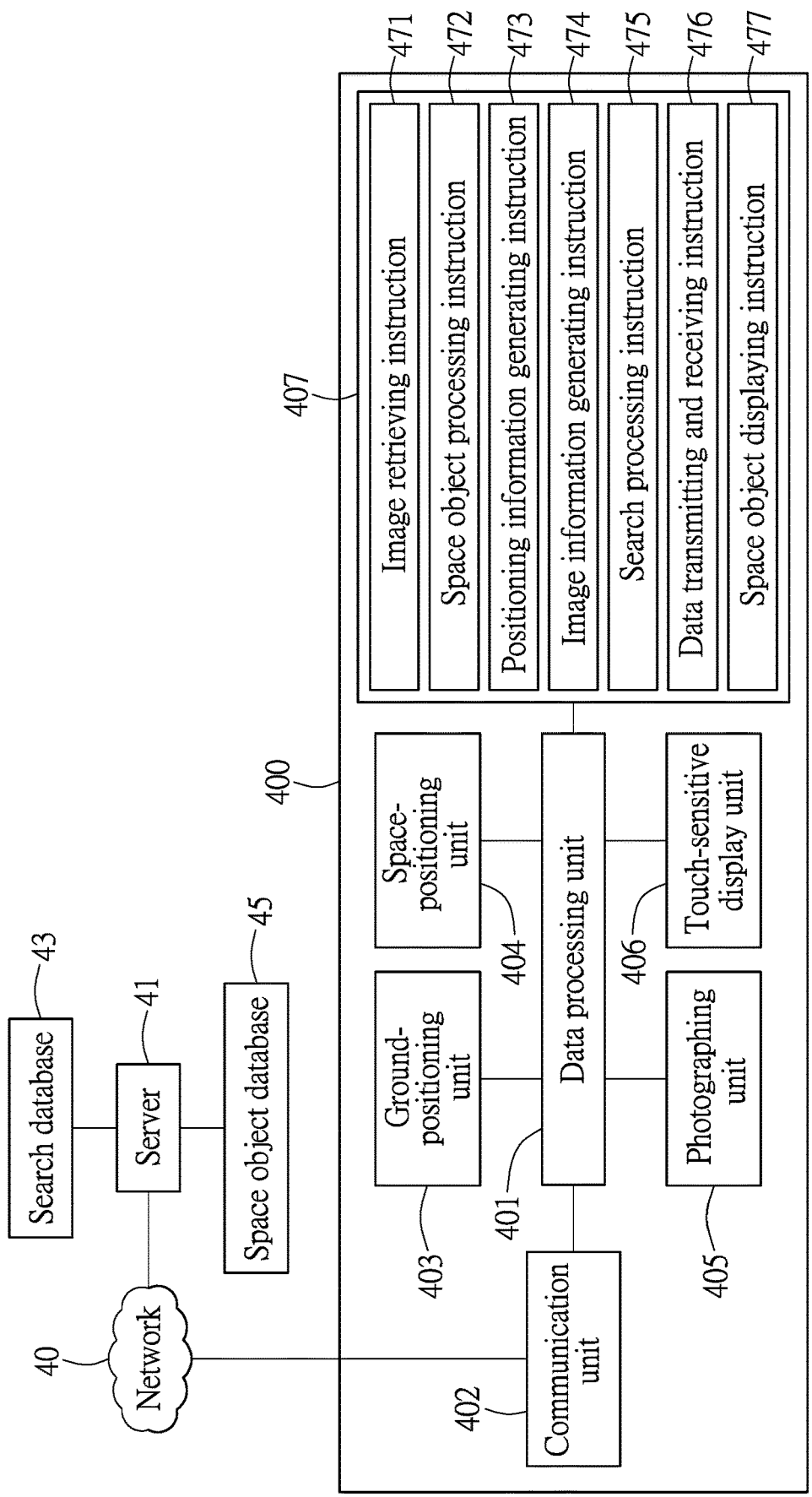
FIG. 4 shows a schematic diagram describing software and/or hardware modules of a mobile device of the system according to one embodiment of the present invention.

FIG. 4 shows a diagram depicting the software modules of the cloud system and the mobile device respectively in one embodiment of the present invention.

The system includes a cloud-based server 41. The server 41 is implemented by a computer system, or a cluster of multiple computer systems for operating various functions. The server 41 is mainly used to receive the data of a space object and corresponding space information uploaded by the user-end mobile device 400 so as to establish a database. Establishment of the database can be based on a search database 43 and a space object database 45. The database is used to record the data generated by the user-end mobile device.

The database is such as a data storage medium that can be divided to the search database 43 and the space object database 45. Both the databases 43 and 45 can be installed into one server, or different sites. The space object database 45 mainly records the data of the space object uploaded by the mobile device 400. The space object can be any type or any combination of a text, a picture, a video, and a sound. The video may comprehensively include a plane graphic animation or a 3D animation. The space object database 45 simultaneously acts as the source provided for the user to search for the space objects using the mobile device 400. The search database 43 mainly records further information relating to the space object uploaded by the mobile device 400. The information is such as the positioning information with respect to the space object, and/or including the color block data and line data corresponding to the scene where the space object is positioned. The color block data and the line data extracted from the real scene related to the space object act as the reference for locating the space object. The server 41 performs an operation procedure of comparison using the space information recorded in the search database 43. One or more space objects can be found in this preliminary procedure. Every space object has its identification that is delivered to the user-end device.

The database is such as a data storage medium that can be divided into the search database 43 and the space object database 45. Both the databases 43 and 45 can be installed into one server, or different sites. The space object database 45 mainly records the data of the space object uploaded by the mobile device 400. The space object can be any type or any combination of a text, a picture, a video, and a sound. The video may comprehensively include a plane graphic animation or a 3D animation. The space object database 45 simultaneously acts as the source provided for the user to search for the space objects using the mobile device 400. The search database 43 mainly records further information relating to the space object uploaded by the mobile device 400. The information is such as the positioning information with respect to the space object, and/or including the color block data and line data corresponding to the scene where the space object is positioned. The color block data and the line data extracted from the real scene related to the space object act as the reference for locating the space object. The server 41 performs an operation procedure of comparison using the space information recorded in the search database 43. One or more space objects can be found in this preliminary procedure. Every space object has its identification that is delivered to the user-end device.

Furthermore, when the space information related to the space object is formed by the user operating the mobile device 400, the searching criteria is also generated. The searching criteria such as a time limit, a viewable range, and/or a user range are configured to be uploaded to the search database 43.

For example, a space object is established at a place correlated to a real scene, and a time limit can be set. The time limit acts as one of the searching criteria. The time limit restricts the user to merely searching for the space objects within a time period in which the seeable space objects also meet the other searching criteria, such as the conditions including the positioning information and image information. The viewable range confines a seeable distance from the real scene, a viewable plane-position range and/or a viewable space-angle range allowing the user to see the space object. The user cannot see the space object until the mobile device 400 held by the user moves within the viewable range.

Further, the user range allows the user to restrict who can see the space object. The number of the users who are allowed to see the space object is configurable, e.g. one or more people. Every user's identification (user ID) will be transmitted to the server 41 when the user operates the mobile device 400 to search for the space object. This user ID is one of the searching criteria. The system establishes the database, e.g. the search database 43 and the space object database 45, using a mass of data uploaded by a plurality of users. A search engine is therefore established, and renders a search service for the user operating the mobile device to search for the space objects.

The mobile device 400 is configured to operate the method for creating the location-based space object, and also for displaying the space object. The mobile device 400 connects to the server 41 over the network 40. The mobile device 400 includes the main circuit components such as a data processing unit 401 that is used to process the signals among the circuit components of the mobile device 400, and the other circuits electrically connected to the data processing unit 401. The mobile device 400 includes a communication unit 402 that is used to establish a connection to an external device. A ground-positioning unit 403 in the mobile device 400 is used to sense the position of the mobile device 400. A space-positioning unit 404 is used to sense the spatial position of the mobile device 400. A photographing unit 405 is for capturing the image of a real scene. A touch-sensitive display unit 406 allows the user to input commands using gestures.

The ground-positioning unit 403 can be implemented by the circuit component of a global positioning system that utilizes positioning signals received from a positioning satellite to generate ground-position data. The positioning scheme can be collaborated with the signals generated by other wireless base stations. The space-positioning unit 404 can be implemented by a gyroscope in the mobile device 400. The gyroscope is used to sense the spatial position of the mobile device 400 in a 3D space, so as to generate a space-angle data essentially constituted of an azimuth angle $\varphi$ and an elevation angle $\theta$.

The system includes a memory unit 407 inside the mobile device 400. The memory unit 407 is such as a non-transitory computer-readable medium that is used to store an instruction set. The instruction set executed by one or more processors of the mobile device 400 is to perform the sequences for creating and displaying the location-based space object. The main sequences of the instruction set are as follows.

First, an image-retrieval instruction 471 is initiated to activate a photographing unit 405 of the mobile device 400 for capturing an image of a real scene. The real scene is displayed on the mobile device 400. A space object processing instruction 472 is used to process a space object created over the real scene by a user using a touch-sensitive display unit 406 of the mobile device 400. The space object can be positioned at front, rear, top, bottom, left or right side of the real scene. The space object can be freely created by the user, or selected from the space object database 45 of the system. The space object is transmitted to the server 41 in a form of any one or a combination of a text, a picture, a video, and a sound. A positioning information generating instruction 473 receives the signals made by a positioning circuit of the mobile device 400. For example, the signals are generated by a ground-positioning unit 403 and space-positioning unit 404 of the mobile device 400, and form the positioning information for locating the mobile device 400. An image information generating instruction 474 is initiated to process the image of the real scene. The image information of the real scene is such as a color block data and a line data that are used to locate the space object. A search processing instruction 475 allows the server 41 to receive the positioning information and the image information generated by the mobile device 400 under a search and display mode and afterwards to produce a search result. A data transmission-receiving instruction 476 is initiated to establish a connection between the mobile device 400 and the server 41, and is used to transmit and receive signals over the connection. The instruction 476 is performed to transmit the positioning information, especially the image information, to the server 41, and receive the search result therefrom. A space object display instruction 477 allows the mobile device 400 to display the space object according to the search result provided by the server 41. The space object displayed on the mobile device 400 can be overlapped to the real scene.

It is noted that the space object can be provided by a system that provides an image library, a video library, and/or a sound library; further, the system allows the user to create/upload the space object using some software tools; or the space object can be a picture photographed by the user.

Figure 5:
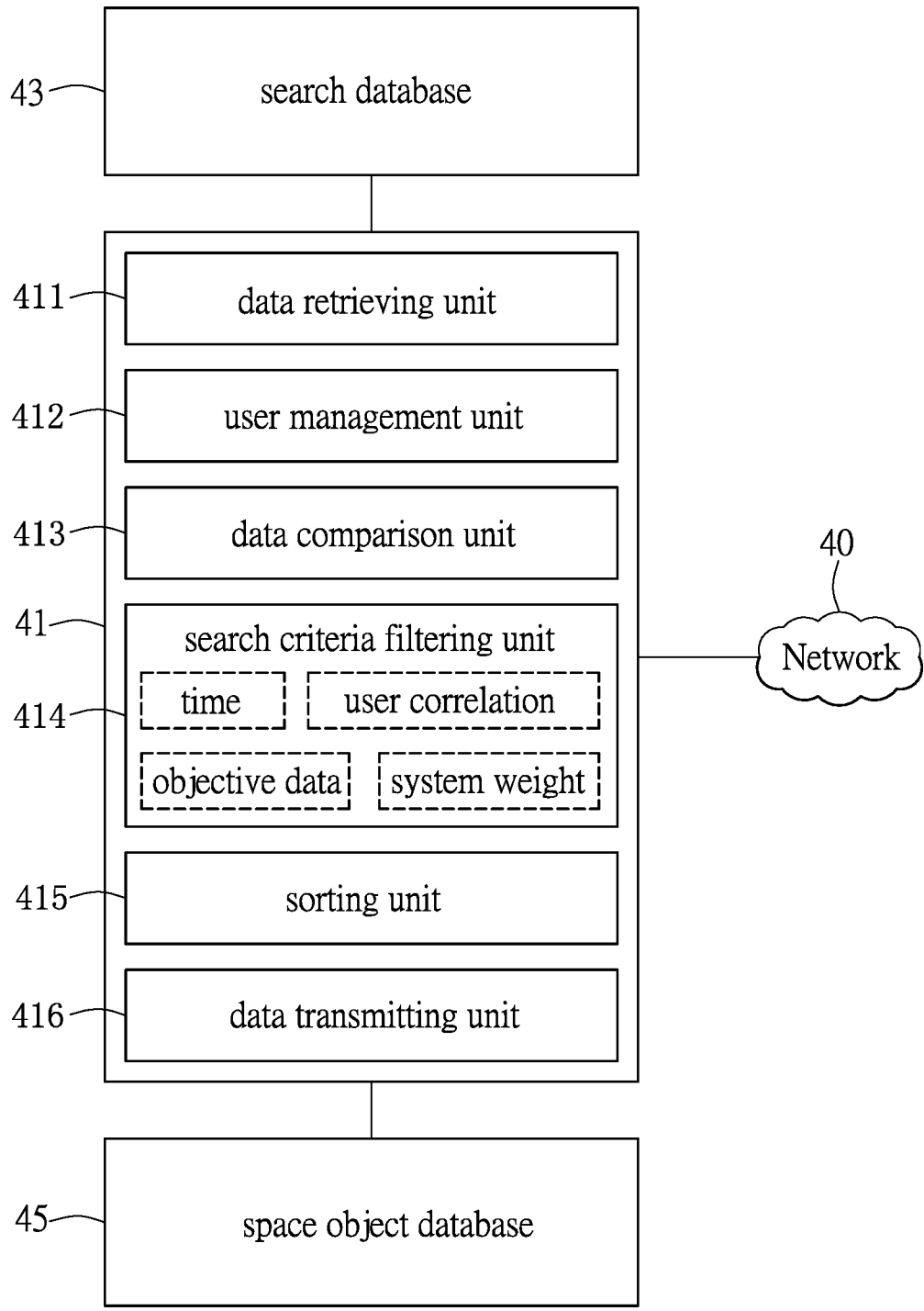
FIG. 5 shows a schematic diagram depicting functional modules in the server of the system in one embodiment of the present invention.

Next, reference is made to FIG. 5. FIG. 5 exemplarily shows functional modules of the server in accordance with the present invention. The functional modules can be implemented by circuits or with software so as to build a cloud system. The cloud system primarily has a search database 43 that records space information with respect to an individual space object among the space objects. The space information exemplarily includes a ground-position data and a space-angle data, or optionally including a color block data and a line data of the background image. Each space object has its unique ID that acts as a search index. Further, each space object has its proprietary search criteria such as any or a combination of a time limit, a viewable range, and a user range that defines a range allowing seeing the space object. It is noted that the viewable range includes a range of a horizontal angle and an elevation angle. The search criteria act as a basis to conduct searching.

A space object database 45 is also provided for storing data of the space objects. Every space object stored in the space object database 45 is in the form of the type of the space object. The space object is any type or any combination of a text, a picture, a video, and a sound. The ID of the space object is used to establish a link to the search database 43 that records every space object's space information and search criteria.

The server 41 is a computer system having one or more processors that is used to perform the method for sorting the search result of the space objects. The server 41 renders a searching service for the terminal users to conduct the searching using their mobile devices over the network 40. The server 41 provides a result after searching and sorting the space objects based on the space information uploaded by the mobile device. The server 41 implements the method by means of hardware or with software.

The server 41 includes a data retrieving unit 411 that can be implemented by circuits for retrieving data from the terminal devices. The server 41 links to the network 40 via a network interface of a host. Therefore the server 41 is able to receive the positioning information and image information generated by the user's handheld mobile device. The positioning information and/or the image information form the reference to search for the space objects.

The user management unit 412 utilizes a memory and a sequence to store the security data such as users' identifications, and passwords. The memory is also used to constantly save the records transmitted from the user-end mobile devices, and the records form the users' historical records. The historical records also act as a part of the user data and become one of the references for sorting the space objects. The user ID becomes the important reference for the system to sort the space objects in the search result. By the sorting, the space objects relevant to the user can have higher priority ranking.

The data comparison unit 413 uses the positioning information uploaded from the mobile device to enquire the search database 43, and to acquire files of the space objects from the space object database 45. The files are then delivered to the mobile device. The data comparison unit 413 generates a preliminary search result. The system further conducts a sorting upon the preliminary search result in order to provide the items of interest to the users.

The preliminary search result is under a process of the search criteria filtering unit 414, and a process of sorting, so as to produce a sorted search result. In the sorting process, several filtering criteria can be introduced so that the search result can converge to a certain number of the space objects. In particular, the result can be much more meaningful to the user requesting the searching.

In an exemplary example, the sorting process is performed based on a user relevant data. The user relevant data recorded in the database can be obtained according to the user ID associated to the space information, e.g. the positioning information and/or image information, in the server 41. When the system receives a user ID from the mobile device, the system can first provide the space object(s) relevant to the user. Further, if somebody creates a personal space object that is specified to a user or a specific group of users, e.g. a user range, the system utilizes the user ID(s) to filter out the personal space object. The personal space object with respect to the user identification is provided by enquiring for the user identification in the database; and for the personal space object that has highest priority ranking for the user(s). On the contrary, users who are not in the user range cannot see the space object specified to the others. The feature allows the system to exclude users who are unavailable to the space objects.

Further, the user relevant data utilizes a user preference and/or a historical record to filter out the space objects of interest for the user. In the database, each space object is relevant to one or more content categories in the database; the preference includes information relating to the one or more user-defined content categories and/or the cloud system determines the one or more content categories according to the historical record. The historical record includes information relating to a staying time and a visit frequency associated to the space object. The system regards a content category as the category of interest to the user when the user stays with the related content for a relatively longer time. Similarly, the visit frequency of content may also be a reference to judge the user's interest. The cloud system utilizes the historical records to determine one or more content of interest categories for the users.

Thus, the system causes the space objects with higher relevance to have higher priority ranking; on the other hand, the space objects with lower relevance will have lower priority ranking. The sorting process may be based on the user relevance of every space object.

In one embodiment, the space object has a time property. The space object provider can assign a time parameter to the space object. The time parameter assigned to the space object is such as assigning a time limit of displaying the space object. The time limit is used to set an available time, e.g. a morning time, a noon time, or an evening time, allowing the user to see the space object. The time parameter is such as an effective display time period assigned to the space object. The effective display time period restricts a time period in the server which is unavailable to search for the space object assigned with the effective display time period. Therefore, the system, using its system time, utilizes the time parameter to be a reference to exclude the unavailable space objects so as to produce the preliminary search result. The mentioned sorting step excludes the space objects whose effective display time period has expired.

Further, the search criteria filtering unit 414 performs the sorting step by utilizing an objective data to determine the priority ranking of the space objects. The objective data includes a creation time, an updated time, an effective time period, a click through rate and/or ranking relating to the space object. The objective data allows the system to determine the priority ranking For example, the space object with an earlier creation time has a higher priority ranking; the space object with a newer updated time or higher updating rate has a higher priority ranking; or the content relevant to the space object with a higher click through rate has a higher priority ranking. Further, any ranking relating to the content associated to the space object can also form relevance of the space object. The space object with higher ranking can also have higher priority ranking.

Furthermore, in addition to the above-mentioned time parameter, user relevant data and objective data for the system to conduct the sorting, a system weighted value can be one of the references for the sorting process if it is assigned to the space object in the system. The space object provider in the cloud system assigns a weight value to every space object. When the cloud system receives those space objects assigned with the weight values, the cloud system comprehensively calculates the system weighted value for every space object. The space object with higher system weighted value has a higher priority ranking.

In an exemplary example, the space object can be an advertisement. The space object provider is such as an advertiser who can propose a price for asking the system to raise the priority ranking of the system weighted value of a specific space object. Still further, several items such as government order and public interest can request for higher priority ranking of the sorting. The system actively changes the ranking of sorting through the system weighted value.

After that, the cloud system utilizes the sorting unit 415 to decide a sorting criterion from the various sorting references. This system-based sorting criterion can also be adjustable due to a practical need.

The data transmitting unit 416 in the system then transmits the sorted result to the mobile device which issued the request for searching for the space objects. When the mobile device receives the result having one or more sorted space objects from the server 41, the space objects in the result can be shown using a display screen. One of the space objects with the highest priority ranking can be shown first. The user can also select one other space object, and the program displays the selected one in response to a selection instruction. It is noted that the space object displayed on the display screen is combined with the real scene.

Figure 6:
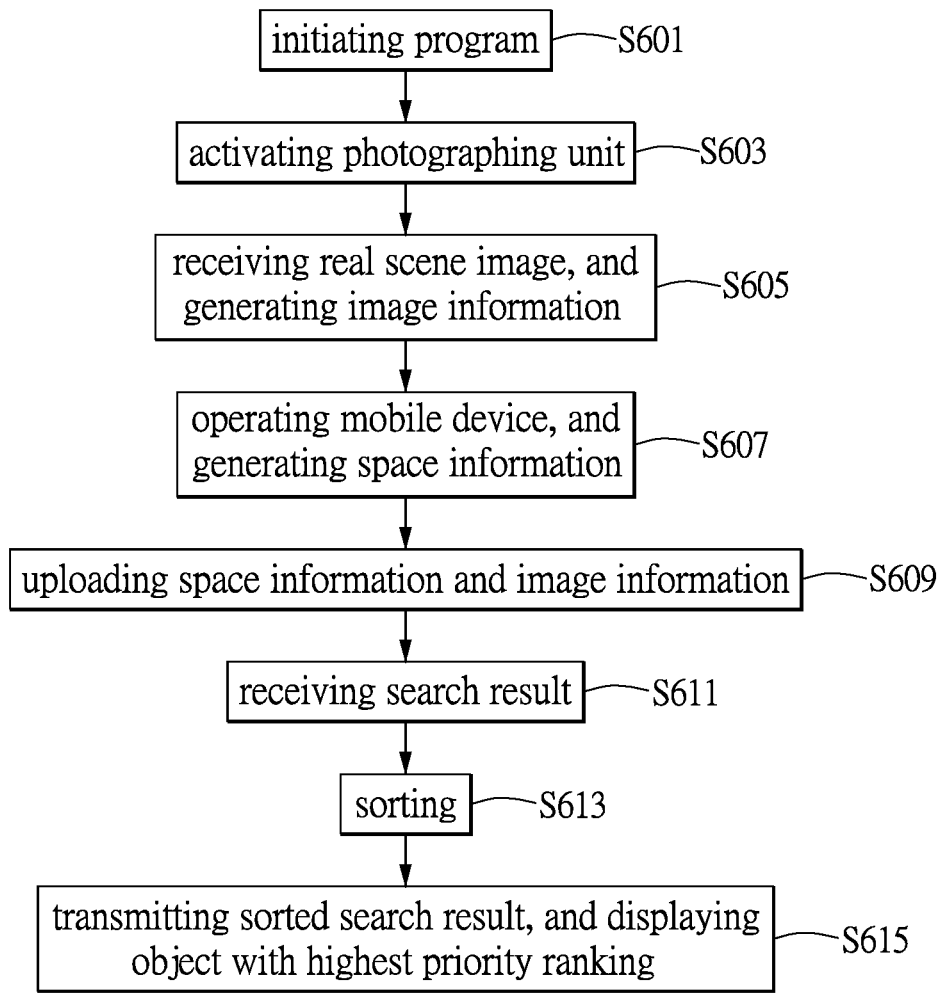
FIG. 6 shows a flow chart describing the method for sorting the search result of space objects in one embodiment of the present invention.

FIG. 6 shows a flow chart depicting a process of sorting the space objects in accordance with the present invention.

In the beginning, such as in step S601, the user operates a mobile device to initiate a program. In the meantime, as in step S603, a photographing unit of the mobile device is activated for capturing a real scene image. The program firstly processes the image and extracts the image features that are used to form image information, as shown in step S605.

After that, as shown in step S607, the user operates the mobile device to move in a space, and the sensors in the mobile device can generate space information, in which the program executed in the mobile device receives the ground-position data and space-angle data generated by a positioning circuit. In step S609, the space information and/or image information are uploaded to a server of the cloud system. In the server, the space information including the positioning information or adding the image information is used to enquire the database in the server for obtaining the space objects in the database. While comparing with the space information in the database, any or a combination of a time limit, a viewable range such as a viewable ground-position range and a viewable space-angle range, and a user range can also be used as the consideration for searching.

In step S611, the server produces a preliminary search result. The preliminary search result can be produced merely based on the space information made by the mobile device. Then the system sorts the preliminary search result, and uses search criteria to filter the search result.

In the step S613, the server performs sorting upon the preliminary search result. The process of sorting can be referred to in the flow chart shown in FIG. 5. The search criteria filtering unit 414 in the system utilizes the user ID as the user relevant data to acquire the user relevant space objects. For example, the system can acquire the personal space object which is specified to a user or users within a range. The search criteria filtering unit 414 also utilizes a user's historical record or preference to search the space objects. It is noted that the result sorted using the user ID generally has a higher priority ranking than other types. The time parameter can be the other condition to conduct the sorting. Further, the objective data relating to the space object can be used to conduct the sorting. Further, the system-made space object can also have high priority ranking in the result. In general, these sorting factors can be taken in consideration by an overall weighting process.

In step S615, the sorted search result is transmitted to the mobile device, and the space object with the highest priority ranking is shown on the display screen. A user interface can be introduced for the user to select one space object to be shown. When one space object has been displayed on the display screen of the mobile device, a list showing other sorted space objects is provided for further selection. It is noted that the space object is any type or any combination of a text, a picture, a video, and a sound.

Figure 7A:
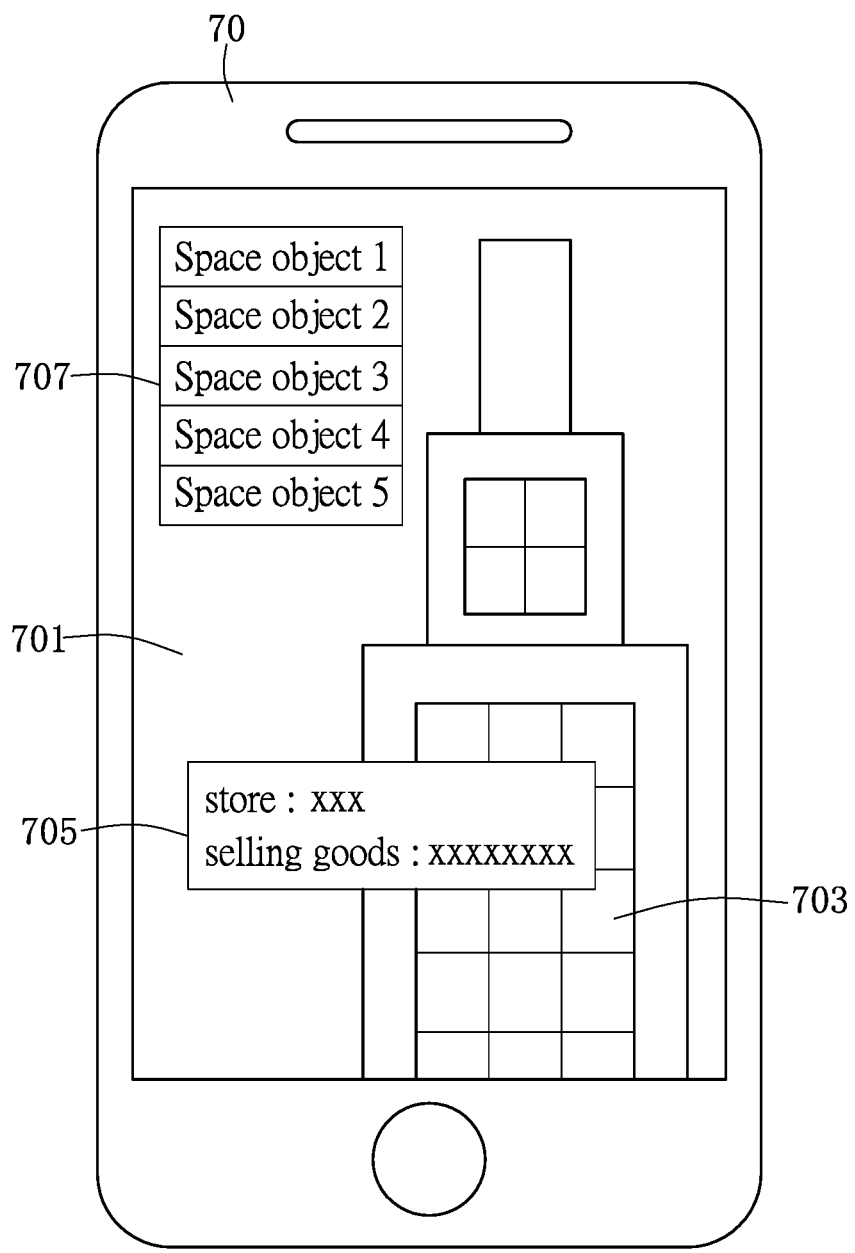
FIG. 7A and FIG. 7B shows a schematic diagram depicting the system rendering a search result according to one embodiment of the present invention.
Figure 7B:
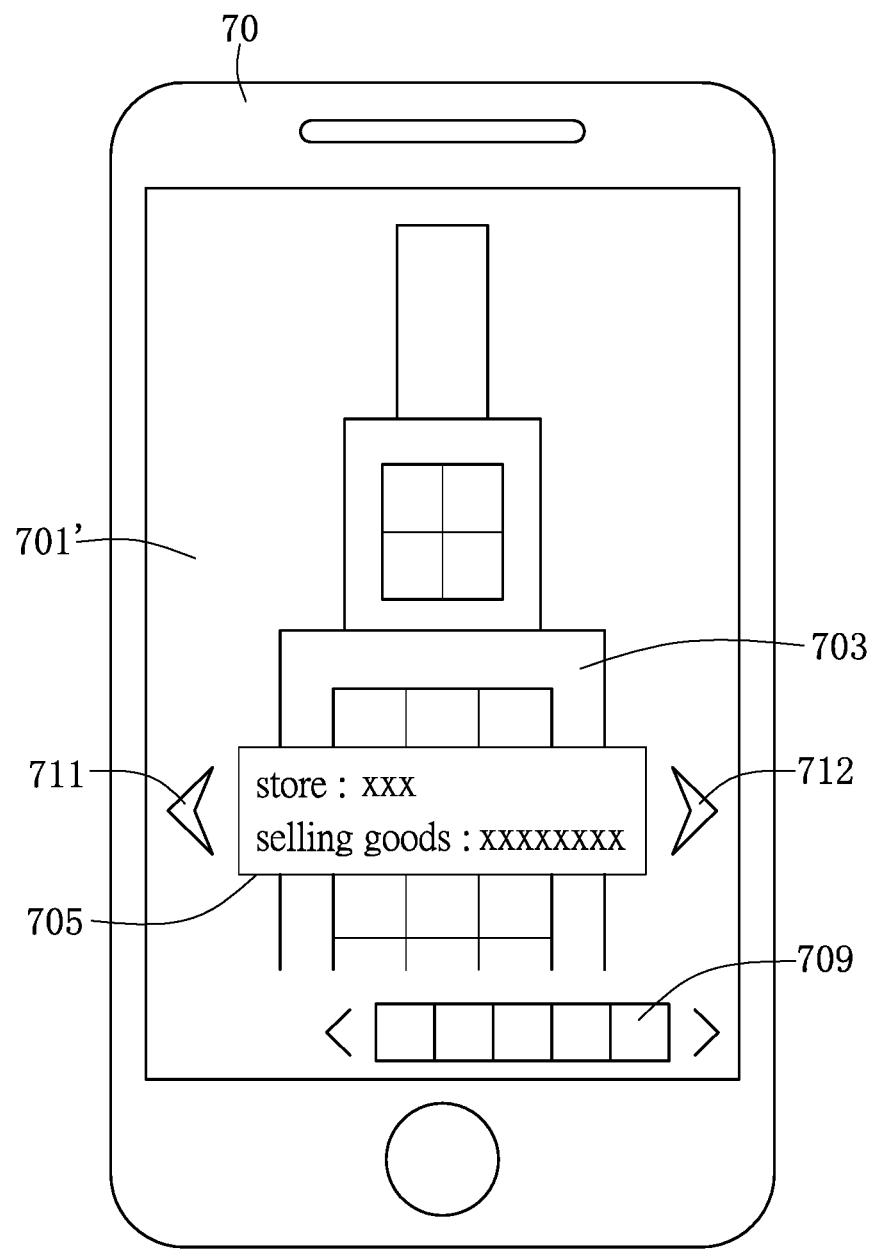

FIG. 7A and FIG. 7B schematically show a GUI on a display screen to display the search result received from a server.

In FIG. 7A, a mobile device 70 is shown. A graphic user interface 701 is initiated using a software program being executed in the mobile device 70. A real scene 703 acting as a video displayed on a display is continuously captured by the mobile device 70. In the meantime, the software program acquires the ground-position data and the space-angle data with respect to the instant state of the mobile device 70. The software program can also acquire the image information of the real scene at the instant. This information forms the space information to be uploaded to a server. In the server, a comparison using the database is performed. One or more space objects with respect to the real scene are found and a final search result will be obtained and transmitted to the mobile device 70 through a searching criteria. The shown space object 705 is one of the items in the search result.

If the search result includes multiple items, as shown in the schematic diagram, a graphic user interface 701 provides a sidebar to show a search result option 707 that allows the user to select the one of interest. The items shown in the search result option 707 are the outcome under the sorting process made in the cloud system. In the exemplary example, the search result option 707 shows the sorted space object 1, space object 2, space object 3, space object 4, and space object 5. The sorting criteria of the list in the search result can be based on the user's friend circle, preference, or correlation.

The way to display the space objects according to the search result may not be limited to the above embodiment. A graphic user interface allowing the user to switch the space objects (1, 2, 3, 4, 5, and 705) using his left-right sliding gesture may be provided. Further, the graphic user interface may adopt an overlapping approach to show the multiple space objects according to the search result, and allow the user to switch the space objects through a touch-sensitive display. Further, every space object may act as a hyperlink button that allows the user to click for getting more information. Still further, another icon may be included in the interface for the user to interact with and link to another information page.

FIG. 7B schematically shows an option menu allowing a user operating a left-right sliding gesture to switch the space objects in the search result.

A program executed in the mobile device 70 initiates a graphic user interface 701' for displaying the real scene image 703 and the related space object 705. A pair of control indications 711 and 712 are provided in the user interface 701' for guiding the user using a gesture, e.g. a left-right sliding gesture, to switch the space objects in the list. However, the switching function may not be required to use the control indications 711 and 712 in a particular embodiment but can allow the user intuitively to slide on a touch-sensitive screen to change the objects. In the present example, a series of preview icons 709 are shown below the graphic user interface 701' for guiding the user to select his object of interest. It is noted that the preview icons 709 before and after the space object 705 with the real scene 703 currently being watched may be simultaneously shown at the same time.

Figure 8:
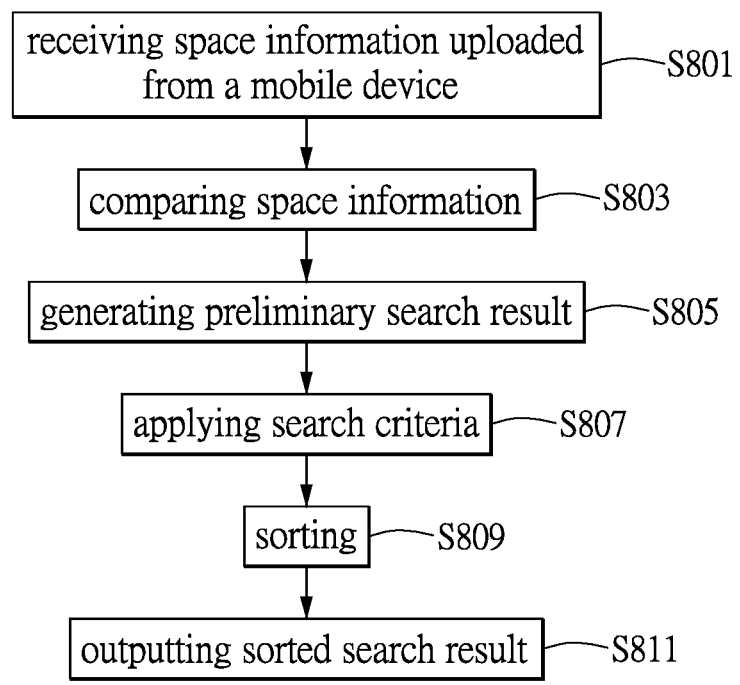
FIG. 8 shows another flow chart describing the method according to one further embodiment of the present invention.

Reference is made to FIG. 8 describing the process of the method for sorting the search result operated in the cloud system in accordance with the present invention.

In the beginning step S801, a server of the cloud system receives the space information from a mobile device. The space information includes the ground-position data and the space-angle data generated by a positioning circuit of the mobile device. The image information, e.g. the color block data and the line data, extracted from the real scene image may also be incorporated. After that, in step S803, in the cloud system, the positioning information and the image information are used to compare the data in the database. It is noted that the color block data and/or the following line data may be uploaded/incorporated for the comparison when the ground-position data and the space-angle data fail to accurately position a space object. The color block data and the line data can be separately or simultaneously provided according to the practical need.

In step S805, the system generates a preliminary search result. The preliminary search result is primarily based on the space information provided by the mobile device. The space information, e.g. ground-position data and space-angle data, confines the search result of the space objects within a specific viewable range. Next, in step S807, the search criteria is applied to the preliminary search result for initially acquiring the result filtered by factors of a time limit and a user range.

Further, the system uses the user identification to filter the search result for acquiring the user relevant space object(s). A personal space object specified to the user may be obtained by filtering the initial search result using the user identification. Still further, the personal historical record or user preference can be incorporated to conduct the filtering upon the search result. After that, in step S809, the space objects in the user relevant search result usually gain higher sorting priority ranking. The other criteria such as a time property associated to every space object, the objective data and the system weighted value for the space object can also be in consideration for conducting the sorting.

At last, in step S811, the system outputs the sorted search result.

Figure 9:
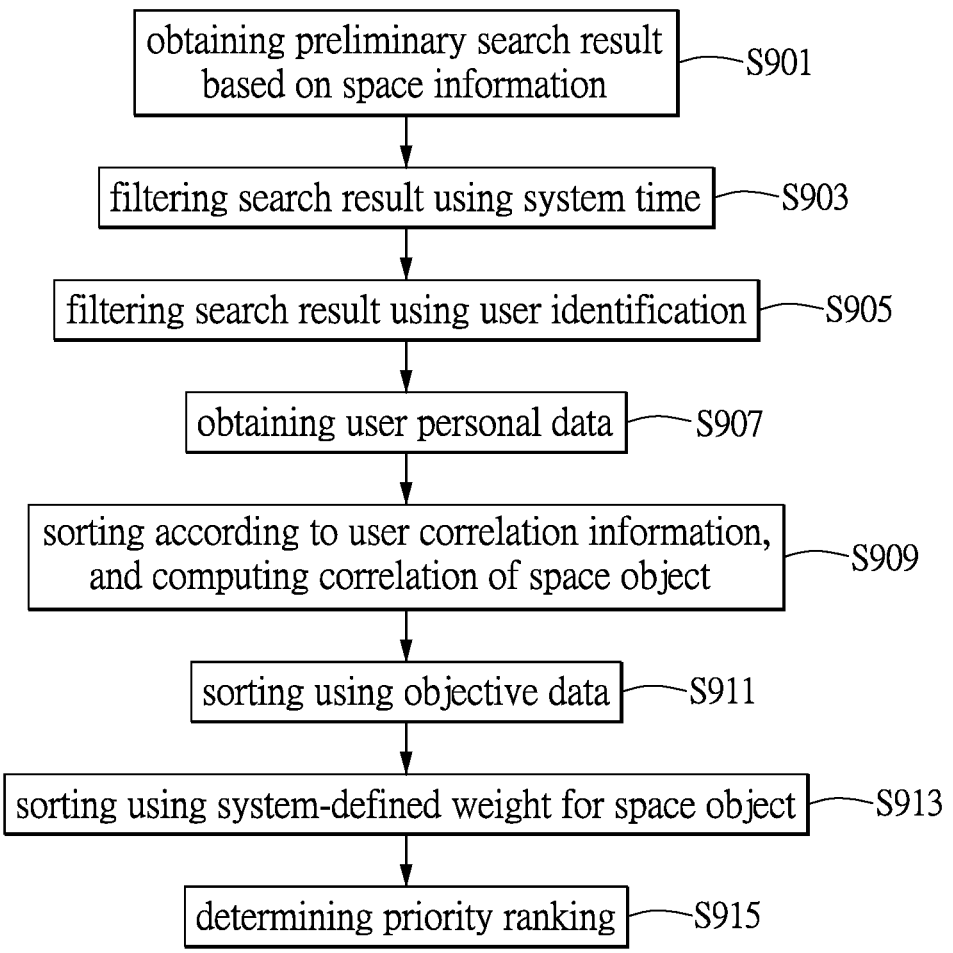
FIG. 9 shows one more flow chart describing the method in one further embodiment of the present invention.

Reference is made to FIG. 9 showing a flow chart describing the method of the present invention.

Continuing the previous process in the embodiment, in step S901, the system generates a preliminary search result based on the space information compared with the data in the database. The preliminary search result can converge to a certain range, such as within a range of combination of a horizontal angle and an elevation angle, of space objects based on the positioning information. The cloud system acquires the space objects within this coverage as compared with the database. Further, the system accurately confines the search result to a certain range of the space objects using the image information associated to the real scene. Based on both the positioning information and the image information, the system acquires the search result more accurately by filtering out the space objects not in compliance with the search criteria using the positioning information and the image information.

In step S903, a time parameter can be incorporated to gain a further search result by excluding the space objects that are not currently visible. The space objects assigned with the effective time periods that have expired can also be excluded. The time factor can be one of the search criteria. The space objects in the search result have been assigned to their available time under the search criteria. For example, because a breakfast shop's advertisement may be merely visible in the morning time, the time limit associated to the space object of the advertisement can be limited to the morning time. If a shop's special offering may be available in the afternoon, the time limit of the space object for the shop's offering can be limited to a time range in the afternoon time. A personal message in the form of the space object is merely visible to the user at the assigned time range.

In step S905, the system utilizes the user identification to filter the search result in order to exclude the space objects not available to the users. In step S907, the system can acquire the personal message for the user by incorporating the user relevant data. The personal message usually has the highest sorting priority ranking in general.

The sorting process incorporating the user relevant data is such as in step S909, the system computes user relevance for every space object based on the user relevant data. In an exemplary example, the user preference can have higher weight value in sorting criteria, and the historical record may have relatively lower weight value. The user identification allows the system to gain the sorting criteria using the user relevance, for example in addition to the personal space object, the system can acquire the user's preference and historical record from a user management unit of the system. It is noted that the historical record includes information relating to a staying time and a visit frequency associated to the space object.

The further sorting criterion is referred to step S911. The system conducts the sorting according to an objective data. For example, a creation time, an updated time and an effective time period associated to a space object can be incorporated to the sorting criteria for sorting the search result. It is noted that the time-expired space object may also be in the search result but it may gain the lowest priority ranking. The other types of objective data can also be one of the references for the sorting process. For example, an updating rate, a click through rate, and/or ranking relating to the space object may influence the sorting result. The space object with an overall higher ranking made by the other users, higher updating rate, and/or higher click through rate can gain the higher priority ranking.

In step S913, the system conducts the sorting according to a system weighted value assigned to the space object. The space object with higher system weighted value will have higher priority ranking in the sorting. However, some types of the space objects not meeting the interests of the user may gain higher sorting priority ranking, for example the price-oriented advertisement, government order, or newsletter (emergency). In an example of an advertisement, the advertiser can provide an advertising fee for raising the weight value in the sorting.

At last, in step S915, the system overall manages the weight values for the space objects based on the sorting criteria such as the user relevant data, time parameter, objective data, system weighted value. The weight value for every space object can be adjusted according to the practical need, by which the priority ranking can be determined. The mentioned system weighted value for every space object is computed by the sequence in the cloud system upon the weight values for the space objects. The higher system weighted value the space object gains, the higher priority ranking it has.

In an exemplary example, the personal message in the form of the space object has the highest priority ranking since it has the highest system weighted value. Secondly, the space object with the highest relevance may have the second highest ranking. Then the objective data of the space object causes the space object to gain higher ranking.

For displaying the search result, the space objects with higher priority rankings will be listed on a first page since the number of pages displayed per page is limited. By default, the space object with the highest priority ranking can be displayed on the main portion of the display. The other options can be shown in the pages. When the number of the space objects in the search result exceeds an upper limit per page, the rest of the objects with lower priority rankings can be listed on the next page.

The present invention is also directed to a computer-readable storage used to store an instruction set operated in a mobile device. The instruction set is executed by a processor of the mobile device for performing the method for sorting the search result. The instruction set primarily includes an instruction for activating a photographing unit of the mobile device, an instruction for capturing a real scene image for rendering the image information, an instruction for obtaining positioning information generated by the mobile device, and an instruction for uploading the positioning information and image information to a cloud system. After that, the sequence in the cloud system initiates a process for comparing the positioning information and/or the image information with the database, a preliminary search result is produced. The instruction set further includes an instruction for sorting the preliminary search result received from the cloud system, and an instruction for outputting a sorted search result.

Thus, in the above-mentioned embodiments of the present invention, in the method and system for sorting the search result, when the plurality of space objects is found by searching the search database based on the positioning information and image information of the real scene, the system further renders a sorting process using the user relevant data, time parameter, objective data, and/or system weighted value for providing the user relevant space objects of interest.

It is intended that the specification and depicted embodiment be considered exemplary only, with a true scope of the invention being determined by the broad meaning of the following claims.

What is claimed is:

1. A method for sorting a search result with space objects, adapted to a mobile device, comprising:
   using a photographing unit of the mobile device to capture a real scene image, and generate image information related to the real scene image;
   obtaining positioning information including a ground-position data and a space-angle data generated by a positioning circuit of the mobile device;
   uploading the positioning and the image information to a cloud system; a preliminary search result being generated in response to the positioning information and/or image information; wherein the preliminary search result includes a plurality of space objects corresponding to the positioning information and/or image information, and each of the plurality of space objects is assigned with a time property and an effective display time period;
   receiving the plurality of space objects from the cloud system after performing a sorting on the preliminary search result; and
   sorting the plurality of space objects according to a user relevant data that includes user identification associated with the positioning information and the image information wherein the user identification is provided for the mobile device to obtain the user relevance data from a database, wherein the space object with higher relevance has higher priority ranking, and the space object with lower relevance has lower priority ranking;
   wherein the sorting step utilizes a system time of the cloud system to filter out the preliminary search result for excluding the space object that does not match a time limit assigned to the space object and the space object whose effective display time period has expired, and also excluding the space object that is not available to the user according to the user identification.

2. The method as recited in claim 1, wherein the effective display time period restricts a time period in a server which is unavailable to search for the space object assigned with the effective display time period.

3. The method as recited in claim 1, wherein, a personal space object with respect to the user identification is provided by enquiring the user identification in the database; and the personal space object with the highest priority ranking is shown on a display screen of the mobile device.

4. The method as recited in claim 1, wherein the user relevant data indicates the user's preferences and historical record.

5. The method as recited in claim 4, wherein the historical record includes information relating to a staying time and a visit frequency associated to the space object.

6. The method as recited in claim 4, wherein, each space object is relevant to one or more content categories in the database; the preference includes one or more user-defined content categories and/or the cloud system determines the one or more content categories according to the historical record.

7. The method as recited in claim 1, wherein the sorting step utilizes an objective data to determine the priority ranking of the space objects; and the objective data includes a creation time, an updated time, an effective time period that is configured to allow the space object visible within a time limit, a click through rate and/or ranking relating to the space object.

8. The method as recited in claim 1, wherein the sorting step utilizes a system weighted value to determine priority ranking of the space objects; in which the system weighted value associated to every space object is configured by a space object provider through the cloud system, and the cloud system computes the system weighted value upon the weight values of the plurality of space objects; and the space object having larger system weighted value has higher priority ranking.

9. The method as recited in any of claim 1, wherein, when the mobile device receives a sorting result including one or more space objects from the cloud system, a display screen of the mobile device is used to display the space object with highest priority ranking, or display the space object according to a selection instruction; and the space object displayed on the display screen is combined with the real scene.

10. The method as recited in claim 9, wherein, when one space object has been displayed on the display screen of the mobile device, a list showing other sorted space objects is provided for further selection.

11. The method as recited in claim 9, wherein the image information of the real scene renders a color block data and a line data associated to the space object after the real scene is processed.

12. The method as recited in claim 9, wherein, in the cloud system, the preliminary search result is generated by comparing the positioning information and/or image information with the database, and further comparing one or any combination of a time limit, a viewable range and a user range.

13. The method as recited in claim 9, wherein the space object is any type or any combination of a text, a picture, a video, and a sound.

14. A method for sorting a search result with space objects, adapted to a cloud system, comprising:
   in a server, receiving ground-position data and space-angle data generated by a positioning circuit of a mobile device;
   the server receiving image information generated from a real scene captured by a photographing unit of the mobile device;
   in the server, comparing positioning information received from the mobile device with positioning information recorded in a database, and/or comparing the received image information with image information recorded in the database, so as to generate a preliminary search result which includes a plurality of space objects corresponding to the positioning information and/or the image information, wherein each of the plurality of space objects is assigned with a time property and an effective display time period;
   sorting the space objects in the preliminary search result according to a user relevant data stored in the database relating to user identification associated to the positioning and the image information in the server wherein the user identification is provided for obtain the user relevance from the database, and outputting the one or more sorted space objects; wherein the sorting causes the space object with higher relevance in response to a user to have higher priority ranking and the space object with lower relevance in response to the user to have lower priority ranking; and
   transmitting the one or more sorted space objects to the mobile device;
   wherein the sorting step utilizes a system time of the cloud system to filter out the preliminary search result for excluding the space object that does not match a time limit assigned to the space object, the space object whose effective display time period has expired, and the space object that is not available to the user according to the user identification.

15. The method as recited in claim 14, wherein the sorting step utilizes an objective data to determine the priority ranking of the space objects; and the objective data includes a creation time, an updated time, an effective time period that is configured to allow the space object visible within a time limit, a click through rate and/or ranking relating to the space object.

16. The method as recited in claim 14, wherein the sorting step utilizes a system weighted value to determine priority ranking of the space objects; in which the system weighted value associated to every space object is configured by a space object provider through the cloud system, and the cloud system computes the system weighted value upon the weight values of the plurality of space objects; and the space object having larger system weighted value has higher priority ranking.

17. The method as recited in claim 14, wherein the image information of the real scene renders a color block data and a line data associated to the space object after the real scene is processed.

18. The method as recited in claim 17, wherein, in the cloud system, the preliminary search result is generated by comparing the positioning information and/or image information with the database, and further comparing one or any combination of a time limit, a viewable range and a user range.

19. A cloud system, comprising:
   a search database, recording data of a plurality of space objects, in which every space object is associated to positioning information and/or image information that acts as search criteria with respect to every space object, wherein each of the plurality of space objects is assigned with a time property and an effective display time period;
   a space object database, storing data of the plurality of space objects, in which every space object is associated to an ID that is used to link to the positioning information and/or the image information and the search criteria with respect to the space object in the search database;
   a server, including one or more processors, used to perform a method for sorting a search result with space objects comprising steps of:
      receiving positioning information generated by a mobile device;

receiving image information generated from a real scene captured by a photographing unit of the mobile device;

comparing positioning information received from the mobile device with positioning information recorded in a database, and/or comparing the image information with image information recorded in the database, so as to generate a preliminary search result which includes the plurality of space objects corresponding to the positioning information and/or the image information;

sorting the space objects in the preliminary search result according to a user relevant data stored in the database relating to user identification associated to the positioning and the image information in the server wherein the user identification is provided for obtain the user relevance from the database, and outputting the one or more sorted space objects; wherein the sorting causes the space object with higher relevance in response to a user to have higher priority ranking and the space object with lower relevance in response to the user to have lower priority ranking; and transmitting the one or more sorted space objects to the mobile device;

wherein the sorting step utilizes a system time of the cloud system to filter out the preliminary search result for excluding the space object that does not match a time limit assigned to the space object, the space object whose effective display time period has expired, and the space object that is not available to the user according to the user identification.

20. A computer-readable storage device, recording an instruction set operated in a mobile device, the instruction set being executed by a processor of the mobile device for performing steps of:

activating a photographing unit of the mobile device;

obtaining an image of a real scene and generating image information;

obtaining positioning information generated by the mobile device;

uploading the positioning and the image information to a server of a cloud system; in the server comparing the positioning information and/or the image information with positioning information and/or image information recorded in a database, so as to generate a preliminary search result which includes a plurality of space objects corresponding to the positioning information and/or the image information, wherein each of the plurality of space objects is assigned with a time property and an effective display time period; and sorting the plurality of space objects in the preliminary search result according to a user relevant data stored in the database relating to user identification associated to the positioning and the image information in the server wherein the user identification is provided for obtain the user relevance from the database, and outputting the one or more sorted space objects;

wherein the sorting causes the space object with higher relevance in response to a user to have higher priority ranking and the space object with lower relevance in response to the user to have lower priority ranking, and the sorting step utilizes a system time of the cloud system to filter out the preliminary search result for excluding the space object that does not match a time limit assigned to the space object, the space object whose effective display time period has expired, and the space object that is not available to the user according to the user identification.

* * * * *